United States Patent [19]
Brazas, Jr.

[11] Patent Number: 5,631,885
[45] Date of Patent: May 20, 1997

[54] WAVEGUIDE-GRATINGS USED FOR ANALYSIS OF OPTICAL BEAMS CONSTRUCTED AS DUAL-PITCH DOUBLE SURFACE CORRUGATIONS

[75] Inventor: John C. Brazas, Jr., Hilton, N.Y.

[73] Assignee: Eastman Kodak Company, Rochester, N.Y.

[21] Appl. No.: 236,977

[22] Filed: May 2, 1994

[51] Int. Cl.$^6$ .................................................. G11B 7/095
[52] U.S. Cl. ...................................... 369/44.23; 369/112
[58] Field of Search ............................ 369/44.12, 44.23, 369/112, 109; 385/14, 15, 37

[56] References Cited

U.S. PATENT DOCUMENTS

| | | | |
|---|---|---|---|
| 4,868,803 | 9/1989 | Sunagawa et al. | 369/44.23 |
| 5,231,620 | 7/1993 | Ohuchida | 369/44.12 X |

FOREIGN PATENT DOCUMENTS

| | | | |
|---|---|---|---|
| 0510750A1 | 10/1992 | European Pat. Off. | 369/44.23 |
| 61-11947 | 1/1986 | Japan | 369/44.23 |
| 63-136334 | 6/1988 | Japan | 369/44.23 |

OTHER PUBLICATIONS

S. Ura, T. Suhara, H. Nishihara, and J. Koyama, "An Integrated–optical Pickup Device", J. Lightware Technol. LT–4, 913–918 (1986).

H. Kando, M. Kainuma, M. Muranishi, A. Ichikawa, and Y. Kusano, "An Integrated Optical Pickup with Small Wavelength Aberration", Proc. ISOM 91, IC–5, Sapporo (1991).

J. Brazas, G. Kohnke, and J. McMullen, "A Mode–index Waveguide Lens with Novel Gradient Boundaries Developed for Application to Optical Recording", Appl. Opt. 31, 3420–3428 (1992).

S. Ura, T. Suhara, H. Nishihara, and J. Koyama, "An Integrated–optic Disk Pickup Device", Electron. Commun. Jpn. Part 2, 70, 92–100 (1987).

G. Bouwhuis, J. Braat, A. Huijser, J. Pasman, G. van Rosmalen, and K. Schouhamer Immink, *Principles of Optical Disc Systems* (Adam Hilger, Bristol, 1987), Chap. 2, pp. 77–79.

K.E. Spaulding and G.M. Morris, "Achromatic Waveguide Input/output Coupler Design", Appl. Opt. 30, 1096–1112 (1991).

M.C. Gupta and L. Li, "Achromatic Compensation for Integrated Optic Grating Couplers with Focused Beams", Appl. Opt. 30, 1461–1463 (1991).

The Photonics Dictionary, 37th International Edition 1991, pp. D–141, D–22.

*Primary Examiner*—W. R. Young
*Attorney, Agent, or Firm*—Raymond L. Owens

[57] ABSTRACT

An optical system for recording or reading out information from an optical disk is disclosed which includes focus detector and data and tracking detectors. An element is disposed in the optical system and responsive to a beam of light projected off of the optical disk and having a transparent substrate and a waveguide with gratings formed on the top and bottom surfaces. The waveguide-gratings have a predetermined grating period, with the periods being different and selected so that a separate focus error signal beam is projected onto the focus detector, and a separate transmitted beam is provided through the waveguide and substrate and projected onto the data and tracking detectors.

5 Claims, 10 Drawing Sheets

WAVEGUIDE-GRATINGS USED FOR ANALYSIS OF OPTICAL BEAMS CONSTRUCTED AS DUAL-PITCH DOUBLE SURFACE CORRUGATIONS

FIELD OF THE INVENTION

The present invention relates to optical systems for recording or reading information from an optical disk and which includes focus error and data and/or tracking error detectors.

BACKGROUND OF THE INVENTION

Hybrid optical systems containing conventional optical elements and integrated optical devices are of increasing interest. Waveguide elements can provide unique means of manipulating light and processing optical information and they have the advantages of reduced size and weight, alignment as part of fabrication, integration with planar detectors and electronics.

Optical disk readout is the analysis of the optical beam returning from the disk surface for write-once and magneto-optical recording media. There has been increasing interest in the use of integrated-optical devices for these optical-pickups. Waveguide-gratings have been used for coupling, and then for processing the guided beam using waveguide lenses, (S. Ura, T. Suhara, H. Nishihara, and J. Koyama, "An Integrated-optical Pickup Device", J. Lightware Technol. LT-4, 913–918 (1986); H. Kando, M. Kainuma, M. Muranishi, A. Ichikawa, and Y. Kusano, "An Integrated Optical Pickup with Small Wavelength Aberration", Proc. ISOM 91, IC-5, Sapporo (1991); J. Brazas, G. Kohnke, and J. McMullen, "A Mode-index Waveguide Lens with Novel Gradient Boundaries Developed for Application to Optical Recording", Appl. Opt. 31, 3420–3428 (1992); S. Ura, T. Suhara, H. Nishihara, and J. Koyama, "An Integrated-optic Disk Pickup Device", Electron. Commun. Jpn. Part 2, 70, 92–100 (1987)) or to input-couple and focus using focusing grating couplers. The focusing of the guided beam is required for detecting movement of the disk out of focus for the objective lens using the pupil obscuration method ((G. Bouwhuis, J. Braat, A. Huijser, J. Pasman, G. van Rosmalen, and K. Schouhamer Immink, *Principles of Optical Disc Systems* (Adam Hilger, Bristol, 1987), Chap. 2, pp. 77–79)). Also, the principles of achromatization for input-coupling over narrow wavelength bands have been demonstrated, extending the potential application of waveguide-gratings to optical systems using standard diode-laser sources ((H. Kando, M. Kainuma, M. Muranishi, A. Ichikawa, and Y. Kusano, "An Integrated Optical Pickup with Small Wavelength Aberration", Proc. ISOM 91, IC-5, Sapporo (1991); K. E. Spaulding and G. M. Morris, "Achromatic Waveguide Input/output Coupler Design", Appl. Opt. 30, 1096–1112 (1991); M. C. Gupta and L. Li, "Achromatic Compensation for Integrated Optic Grating Couplers with Focused Beams", Appl. Opt. 30, 1461–1463 (1991)).

The focus and tracking error signals must be independently observed with little crosstalk between these signals. As a practice, the signals are extracted from the optical beam returning from the disk by methods in an orthogonal manner on distinct detectors or summing the electrical signal from multiple detectors. The methods used for high performance optical recording systems have required analysis of the focus error signal in the near-field of the optical beam (i.e., focusing the beam returning from the optical disk onto a split detector pair). The element described herein provides the alternative of detecting the focus error signal orthogonal to that of the tracking error signal and by far-field analysis which permits or increases in the size of the detectors and increases the tolerance for their placement.

SUMMARY OF THE INVENTION

It is an object of the present invention to provide an improved way of forming a focus error beam which is separated from data and tracking errors and eliminates the problems of the prior art.

This object is achieved in an optical system for recording or reading out information from an optical disk and which includes a focus error detector pair and data and/or tracking error detector pair, the improvement comprising:

a) an element responsive to a beam of light projected off of the optical disk and having a transparent substrate and a waveguide with gratings formed on the top and bottom surfaces, each waveguide-grating having a predetermined grating period, with the periods being different and selected so that one of the grating periods causes a separate focus error signal beam which is projected onto the detector pair for focus error detection, and a separate transmitted beam is provided through the element and projected onto the detector pair for data and/or tracking error detection.

It is a feature of this invention that the combination of waveguide-gratings with conventional optical components can be used with a hybrid-optical head for input-coupling and simultaneously processing the beam returning from the optical disk to generate the position error signals (focus and tracking).

The advantage of using the grating element would be in the simplification of the error signal by reducing its generation to a single element, and by reducing the volume and mass of the detection scheme accordingly. Also, the use of this element would greatly relax the tolerance for detector positioning, which is critical for the manufacturing of conventional optical heads; the only critical alignment would be tilt of the grating.

DETAILED DESCRIPTION OF THE INVENTION

Figure 2:
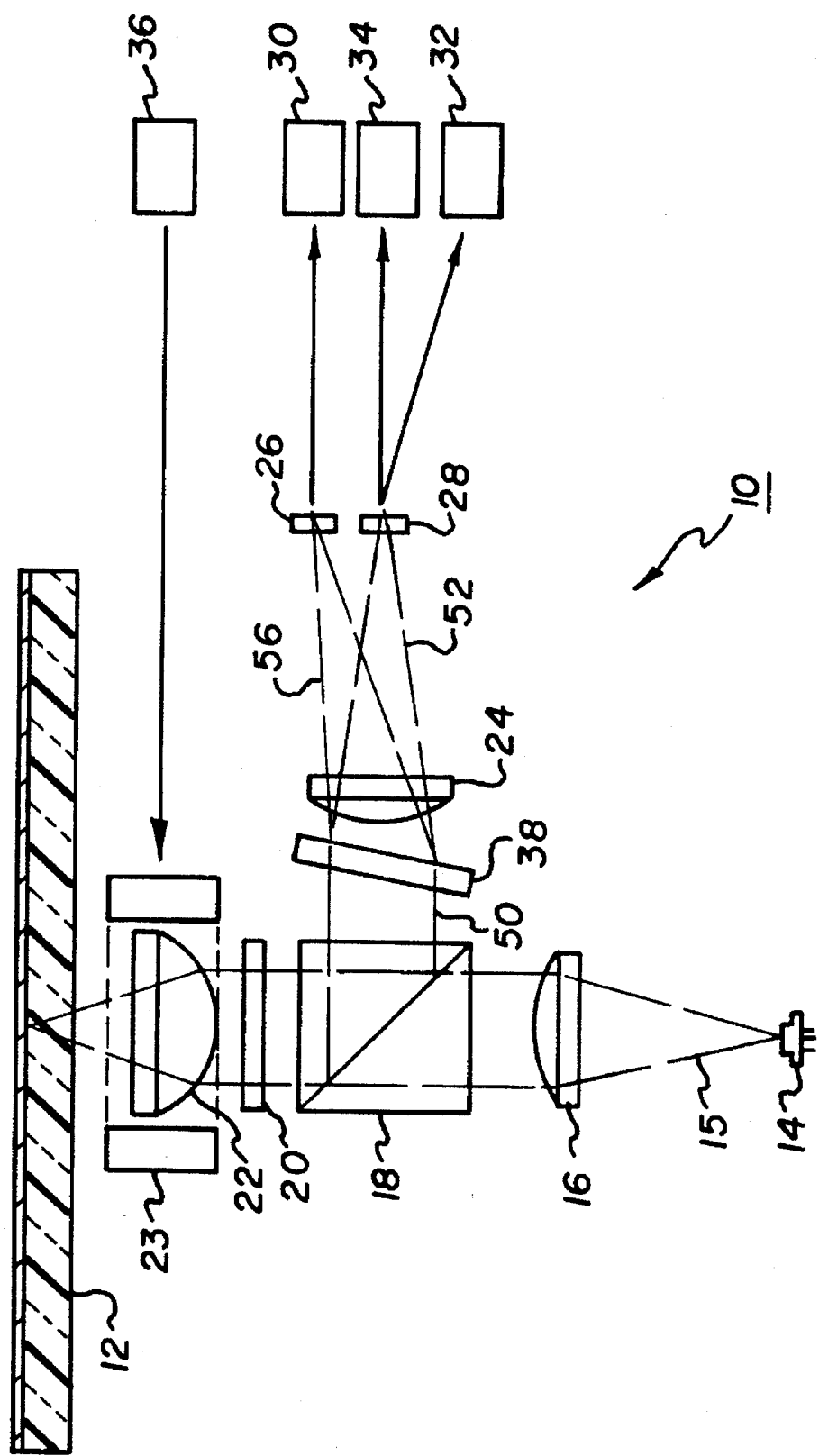
FIG. 2 is a schematic illustration of an optical system for recording or reading out from an optical disk and which includes focus and tracking error detectors and a novel optical element in accordance with this invention.

Turning first to FIG. 2 where an optical system 10 for writing or reading out information from an optical disk is shown. An optical disk 12 is schematically depicted and will receive a beam of light 15 provided by a laser diode 14 and reflects a beam of light 50 back into the system 10. Data are either recorded or read out from the optical disk 12. The laser diode 14 provides a radiation beam 15 which is collimated by a lens 16. The collimated radiation beam 15 is transmitted through a polarization beam splitter 18 and applied to a quarter-wave plate 20. The polarization beam splitter 18 provides linear polarization for the radiation beam and a quarter-wave plate 20 provides circular polarization to the radiation beam. Light is focused by an objective lens 22 onto the optical disk 12 for either recording or reading. The interaction of the light and the optical disk 12 causes the beam to be reflected and diffracted therefrom. Actually, there are three beams produced in a typical system. A reflected beam and positive and negative first order diffractive beams are created from tracking grooves or marks on the disk.

The quarter-wave plate 20 restores the linear polarization to these beams, however, the polarization is orthogonal to that of the incident beam and the polarization beam splitter 18 will then separate the returning beam from the incident beam path. This beam 50 is incident on element 38 and a condensing lens 24. The condensing lens 24 projects separate beams 56 and 52 for focus error detection and data and tracking error detection, respectively. As shown, there are focus error detector pair 26 and data and tracking error detector pair 28, where the detector pair can be composed of at least two distinct detector areas. The focus error detector pair 26 provides signal for focus error signal processing 30 and the detector pair 28 provide separate signals for data signal processing 32 and tracking error signal processing 34. The focus and tracking error signals are fed back to an actuator controller 36 which, as well understood in the art, controls an actuator 23 that positions the lens 22 with respect to the disk 12.

In accordance with the present invention, there is provided an element 38 which uniquely forms separate beams for projection onto the detector pair 26 and 28.

Figure 3:
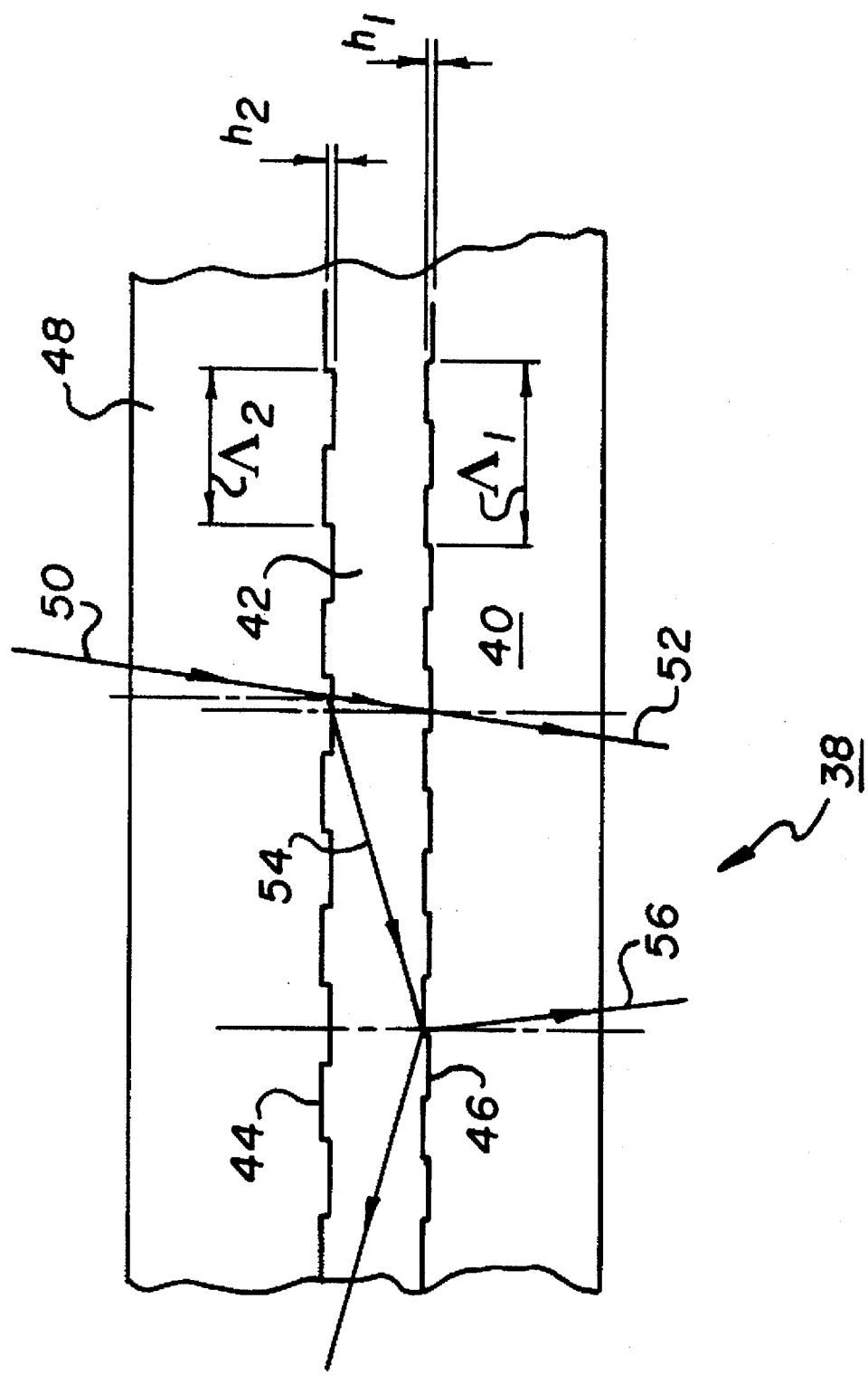
FIG. 3 illustrates in more detail a waveguide structure in accordance with the present invention which produces separate focus error and data and tracking error beams.

FIG. 3 shows in cross section the element 38. Element 38 includes a transparent substrate 40 having an index of refraction less than that of the waveguide and a waveguide 42 having gratings 44 and 46 on top and bottom surfaces.

Cladding layer 48 is provided on the waveguide. It can be formed of glass or air and has an index of refraction less than that of the waveguide. As shown, a beam of light 50, which exits from the polarizing beam splitter 18 and is incident on the cladding layer 48, is transmitted through the cladding layer 48 and is incident upon the grating 44. The beam splits into two beams of interest 52 and 54. Beam 52 continues through the element 38 the substrate 40 and includes data and tracking error signals. Beam 54 is the result of diffraction from grating 44 and couples into the guided mode of the waveguide 42. The guided mode interacts with grating 46 to diffract out a unique focus error beam 56. Beam 56 is incident on focus detector pair 26 as shown in FIG. 2, and beam 52 is incident upon data and tracking detectors 28.

To create separate focus and/or data and tracking beams, uniform gratings fabricated by holographic exposure techniques having different pitches were fabricated on the upper and lower surface of a waveguide 42. The first grating 44 input coupled the incident beam 50 and the second grating 46 provided a distinct output coupled beam 56 for characterization of the incident beam 50. These gratings 44 and 46 provide a novel way of generating a focus error signal, where the signal is uniquely observed in the far field and reduces the difficulty in detector alignment. Also, by using the full aperture of the incident beam 50 for generation of the signal, the effect of disk 12 birefringence associated with compact disk materials (on focus error signal generation) is reduced. High quality focus error signals have been generated using an element like that of FIG. 3 with crosstalk from tracking position errors less than ±0.25 µm.

Figure 1:
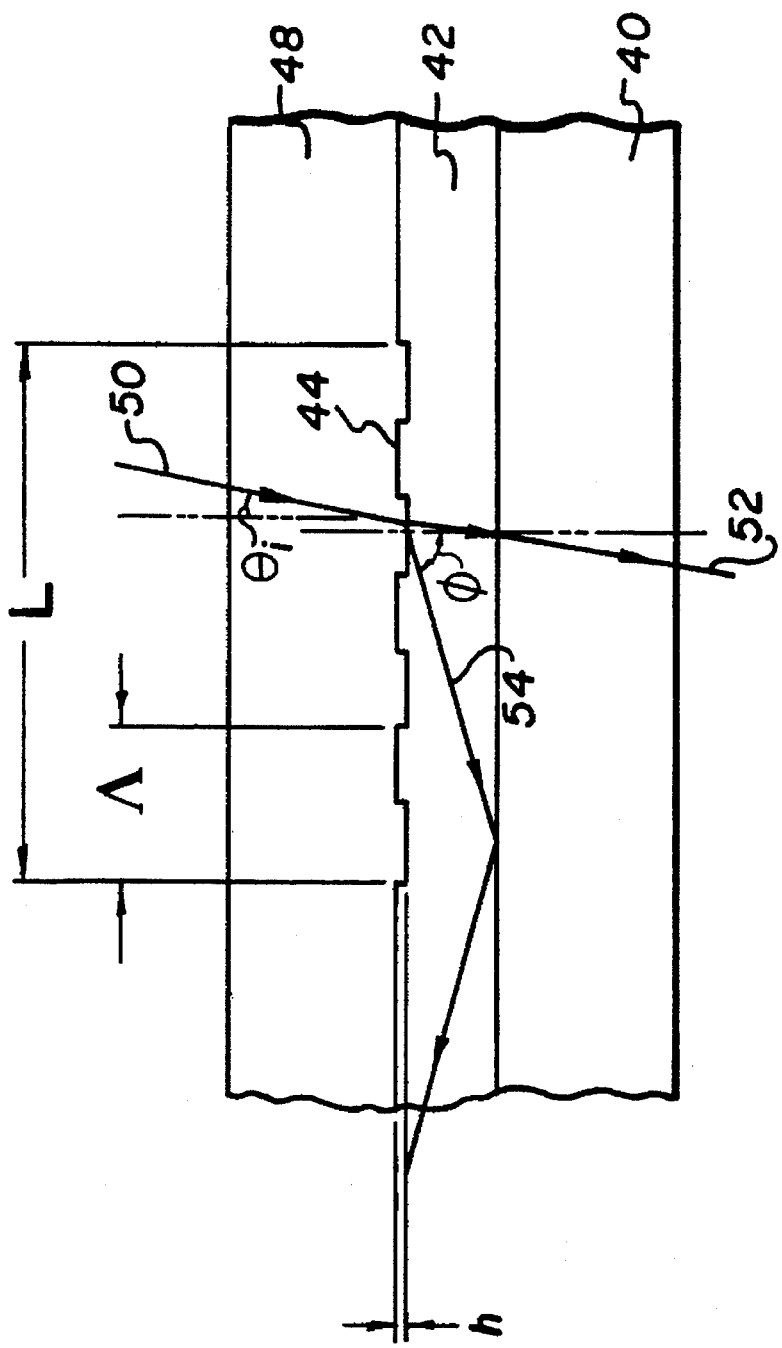
FIG. 1 is a schematic which shows the operation of a traditional waveguide system.

Turning now to FIG. 1 where a prior art arrangement is shown, which will explain the operation of the input coupling process more fully where items correspond to those previously described in FIG. 3, the same numerals will be used for clarity of explanation.

Propagation of an electromagnetic wave in a waveguide, as described by ray optic techniques, has been used to derive the well-known dispersion relation of a slab waveguide. Referring to FIG. 1, the beam 54 shown as a solid-line ray trace within the waveguide 42 represents the propagation of a plane wave contained within the waveguide by total-internal reflection at the waveguide surfaces. It will be noted that there is a grating 44 at the interface between the waveguide 42 and the cladding 48 as is conventional. A propagation constant, $\beta$, characterizing the guided light, is defined as $$\beta = \frac{2\pi}{\lambda} n_f \sin(\phi) \tag{1}$$

where $\lambda$ is the wavelength of light, $n_f$ is the waveguide refractive index, and $\phi$ is the propagation angle. Based on the dispersion relation, discrete values of $\beta$ are allowed and are referred to as guided modes. In this work, only the lowest-order mode (zero) having transverse electric, TE, polarization for a wavelength of 632.8 nm was considered.

Coupling of a radiation mode to a guided mode can be understood by the basic diffraction principles of a grating. The grating 44 is located at the surface of the waveguide (see FIG. 1) so that for the proper incident angle $\theta_i$ of a diffracted beam will be at the proper angle $\phi$ within the waveguide, allowing the exchange of energy between radiation and guided modes. The condition of coupling is based on the compensation of the difference in the propagation constants, $\beta_i$ and $\beta$, where $\beta_i$ is the incident radiation mode defined as $$\beta_i = \frac{2\pi}{\lambda} n_i \sin(\theta_i) \tag{2}$$

with $n_i$ being the refractive index of the medium of incidence, the cladding 48, as shown. The refractive index of the waveguide 42 is greater than the refractive indices of the substrate or cladding 48. The coupling condition is satisfied through the use of a grating 44 according to the grating equation, expressed as $$\beta_i = \beta + 2\pi \frac{m}{\Lambda} \tag{3}$$

where m is the diffraction order, −1 for input coupling, and $\Lambda$ is the period of the grating grooves, and is usually selectable for specifying the input-coupling angle $\theta_i$.

For a given incident beam 50 and waveguide-grating 44, there will be a narrow range of angles over which light can be coupled into the waveguide rather than a discrete angle $\theta_i$. The full-width-half-maximum (FWHM) of the input-coupling efficiency for an angular scan is termed the angular width $\Delta\theta$. An understanding of how to control the range of input-coupling by selecting the physical dimensions of the system is important for establishing the working range of practical systems. Only recently has the effect of these finite lengths associated with these waveguide-grating systems been investigated despite the practicality of the issue. This is of primary interest for waveguide systems used to analyze the angular content or angle change of a beam incident on an input-coupling grating, as is the case for an integrated-optic pickup system for optical recording applications.

The finite lengths of a waveguide-grating system used for input-coupling includes the waist of the incident beam 50, length L of the grating 44 pattern perpendicular to the grating grooves, and the coupling length resulting from the intrinsic characteristics of the waveguide-grating system and grating groove depth L. Coupling length is unique to gratings used in waveguide systems, and results from the containment of the guided mode proximate to the grating. Light propagating along the grating length will "leak" from the waveguide at a rate defined by an attenuation coefficient, α, used in the relation $$I_z = I_0 e^{-2\alpha z} \qquad (4)$$

where $I_0$ is the initial intensity and $I_z$ is the intensity at a position z along the axis of propagation. The attenuation coefficient affects the absolute efficiency of input-coupling, and determines the distance of propagation over which light is input-or output-coupled, commonly referred to as the coupling length, $L_c = 1/\alpha$.

The angular width can be dominated by one of the characteristic lengths when it is much less than the other two. For the input-coupling grating 44 used in this work, the coupling length Lc had the most significant contribution. The following presents the expression for the angular width Δθ, the full-width half-maximum of the dependence of normalized input coupling efficiency η on the incident angle $θ_i$, $$\Delta\Theta = \frac{1}{\pi} \frac{\lambda}{L_c n_c \cos \theta_i} \qquad (5)$$

Also, the absolute efficiency of input-coupling is important when designing a practical system, and there will be a trade-off between higher input-coupling efficiency and broader range of angles for coupling. The relative efficiency of input-coupling η, normalized so that the value at zero detuning is unity, can be expressed as $$\eta = \frac{\alpha^2}{\alpha^2 + \Delta\beta^2} \qquad (6)$$

where Δβ is the detuning of the propagation constants in Eq. (3). An understanding of these principles is important for designing waveguide-gratings to process optical information contained in the incident beam 50.

Grating and Waveguide Fabrication

A configuration of waveguide-gratings is presented here. In this system, the grating 46 is formed on the substrate 40 and has a specified pitch $\Lambda_1$ and depth $h_1$. Both gratings 44 and 46 were relief gratings fabricated by forming a photoresist mask and then ion milling the grating grooves into the underlying material. A complete illustration of the grating system is shown in FIG. 3. The substrate 40 was a common glass. Atop the grating the waveguide 42 was formed by sputtering glass Corning 7059 to a thickness of about 0.38 μm. Finally, the second grating 44 was formed atop the waveguide 42 having a specified pitch Λ2 and groove depth $h_2$.

The waveguide-grating system will support a guided mode which can be input coupled using either gratings 44 or 46. Once the light is input coupled, the guided mode will interact with both the gratings 44 and 46 and be output coupled at angles determined by the system specifications. For the system fabricated the upper grating 44 input coupled light from the cladding 48 at an angle of 10.17° and the lower grating 46 at an angle of −8.9°. Although light is input coupled by only one grating 44, both gratings 44 and 46 will produce output coupled beams. When the incident beam 50 is input coupled using grating 44, the output beam appearing in the substrate associated with grating 44 will overlap the transmitted beam 52 (see FIG. 3). The output beam 56 associated with the lower grating 46 will be output coupled at a unique angle for this example. The intensity of this second beam 56 will almost entirely depend on the efficiency of input coupling (i.e., maintaining the nominal angle of incidence).

A collimated beam, using a ray optical representation, has a single angle of propagation. When a beam becomes decollimated an angular spectrum appears across the aperture of the beam, where the magnitude of the angle is dependent on the distance from the optical axis (chief ray) in the cross sectional view.

For an optical recording head, a critical analysis is the detection of focus errors for the disk surface relative to the objective lens 22. The beam 50 returning from the optical disk 12 (see FIG. 2) is isolated using the polarizing beam splitter 18 and it carries information about tracking and focus errors and the data read from the disk 12. When a focus error occurs, the disk 12 is too near or away from the objective lens 22. The result is a decollimation of the beam 50 returning from the disk 12.

Figure 4A:
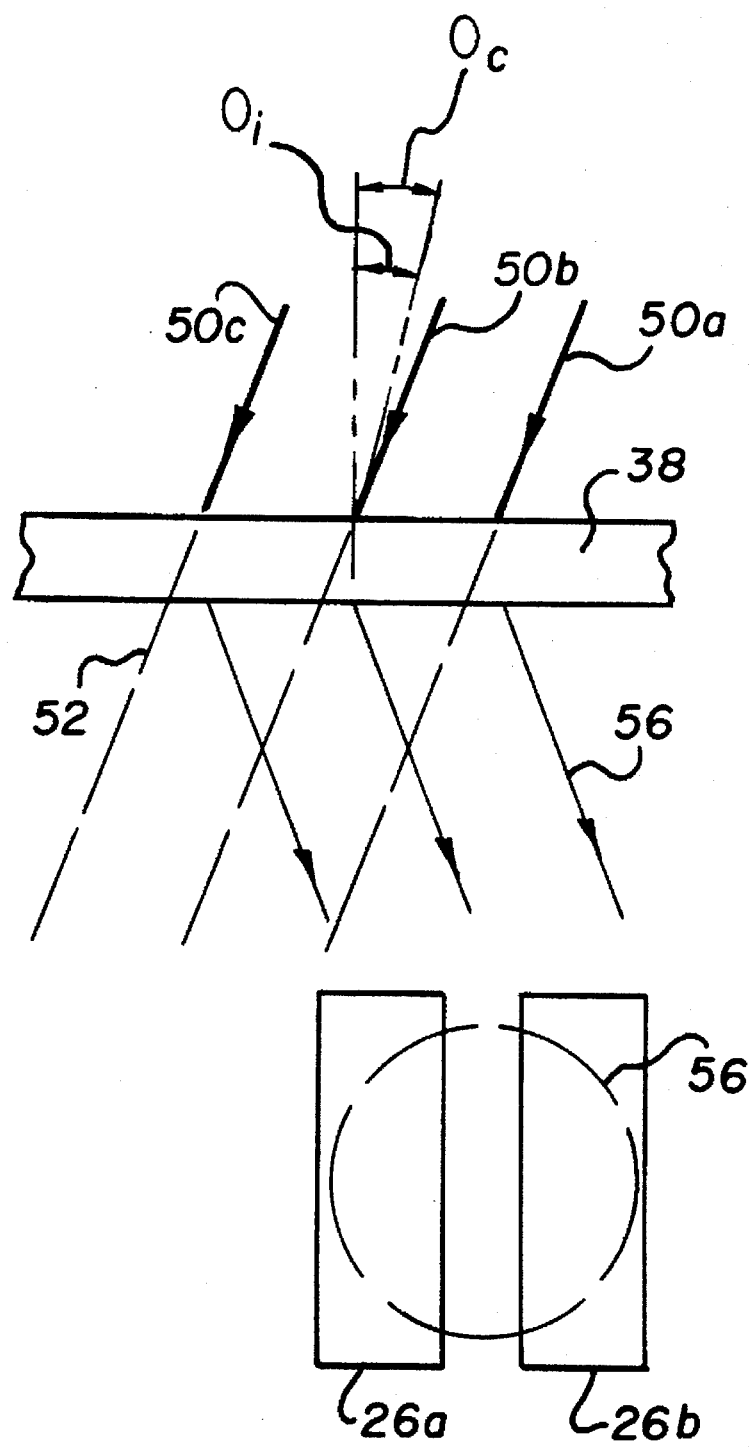
FIGS. 4a–e illustrates an incident beam returning from an optical disk and which is incident on an element to produce two distinct optical beams, one of which is projected onto detector pair.

The following is a discussion of the detection of an error for the separation of the objective lens 22 from the disk 12, focus error. The element 38 produces a unique form of the focus error beam 56. The beam 56 can be analyzed in the far field and utilizes the full aperture of the optical system 10, unlike the pupil obscuration method mentioned above. For a disk at the nominal position and the element 38 inserted into the path of the beam 50, there should be uniform coupling of light from beam 50 into the guided mode of the waveguide 42 when the element 38 is rotated to the proper angle θ (see FIG. 4a). The marginal rays 50a and 50c and the chief ray 50b are illustrated and the grooves of the gratings 44 and 46 are perpendicular to the page so that the sensitivity of input coupling angle is illustrated in the plane of the page in the lower section of FIGS. 4a–4e. This sequence of FIGS. are presented to illustrate the effect of the disk position on the beam 56 intensity distribution. The lower section of each FIG. shows the placement of detector pair 26 which actually is a pair of detectors 26a and 26b and are used to generate a useful electrical signal for focus error detection as a result of the incident beam 56.

EXAMPLE 1

To generate a desired effect, a proper focus error signal, the incident angle is adjusted away from the coupling angle $\theta_c$ for peak efficiency of input coupling to a new incident angle $\theta_i$. The focus error signal (FES) is the result of differencing the signals from the detectors 26a and 26b. The beam 56 exiting below the element 38 was not focused, rather large area detectors 26a and 26b were used, as illustrated. The output coupled beam was centered on the gap between detectors 26a and 26b. To increase the speed of readout of data, the detector pair 26 and 28 response time can be reduced by reducing the size of the detector pair 26 and 28 and placing them near focus of a lens 24 inserted after the element 38.

Figure 4B:
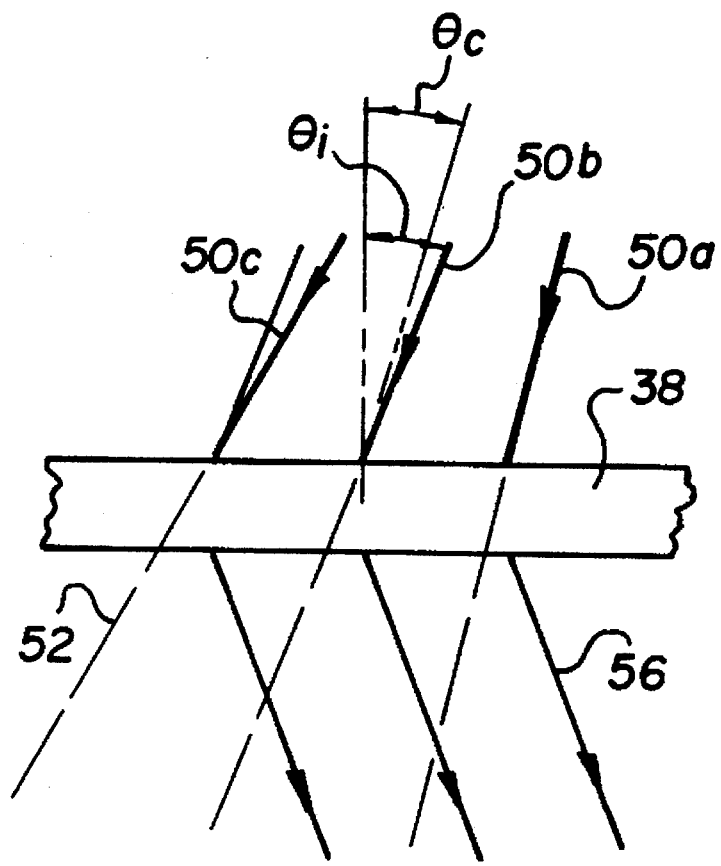
Figure 4C:
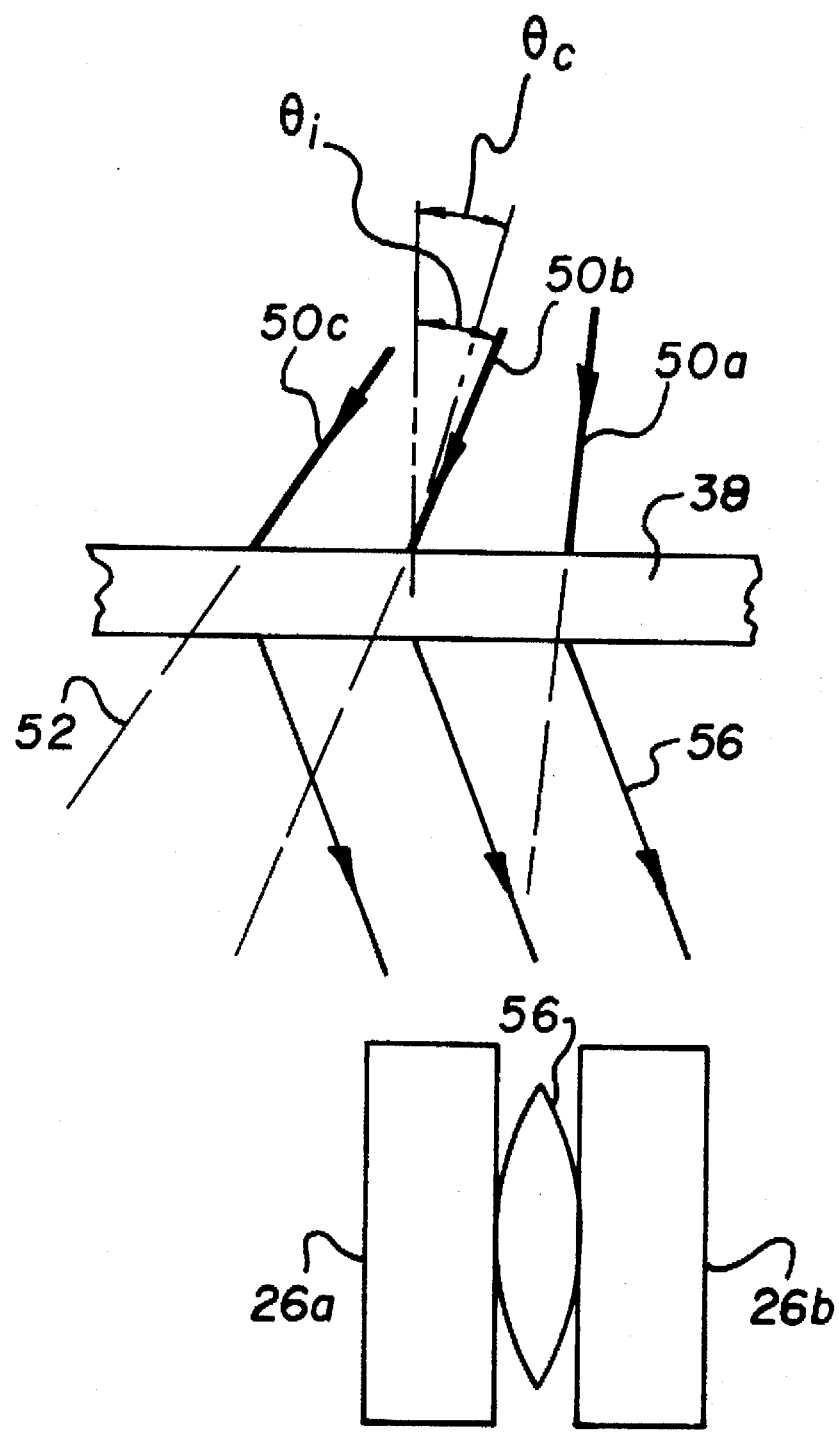

When the surface of the disk 12 is too near the objective lens 22, the beam 50 returning from the disk is diverging as shown in FIG. 4b. Examining the marginal rays 50a and 50c of this FIG., the side of the aperture containing ray 50c will contain ray angles which are further from the peak-efficiency coupling angle $\theta_c$ and the results will be a decrease in the intensity falling onto detectors 26a. However, the right half of the aperture will contain angles nearer the nominal coupling angle $\theta_c$ and the intensity on detector pair 26b will increase. As the separation between the disk 12 and objective lens 22 continues to decrease (see FIG. 4c), the angle sweep will continue until the angle of the marginal ray 50a has swept through the coupling angle $\theta_c$ and is now at an angle where the input coupled intensity has decreased, decreasing the intensity falling onto detector pair 26b. The final intensity pattern falling onto the detectors 26a and 26b is a bright center region, as illustrated, near the chief ray where there has been very little change in the angle from the incident angle $\theta_i$.

Figure 4D:
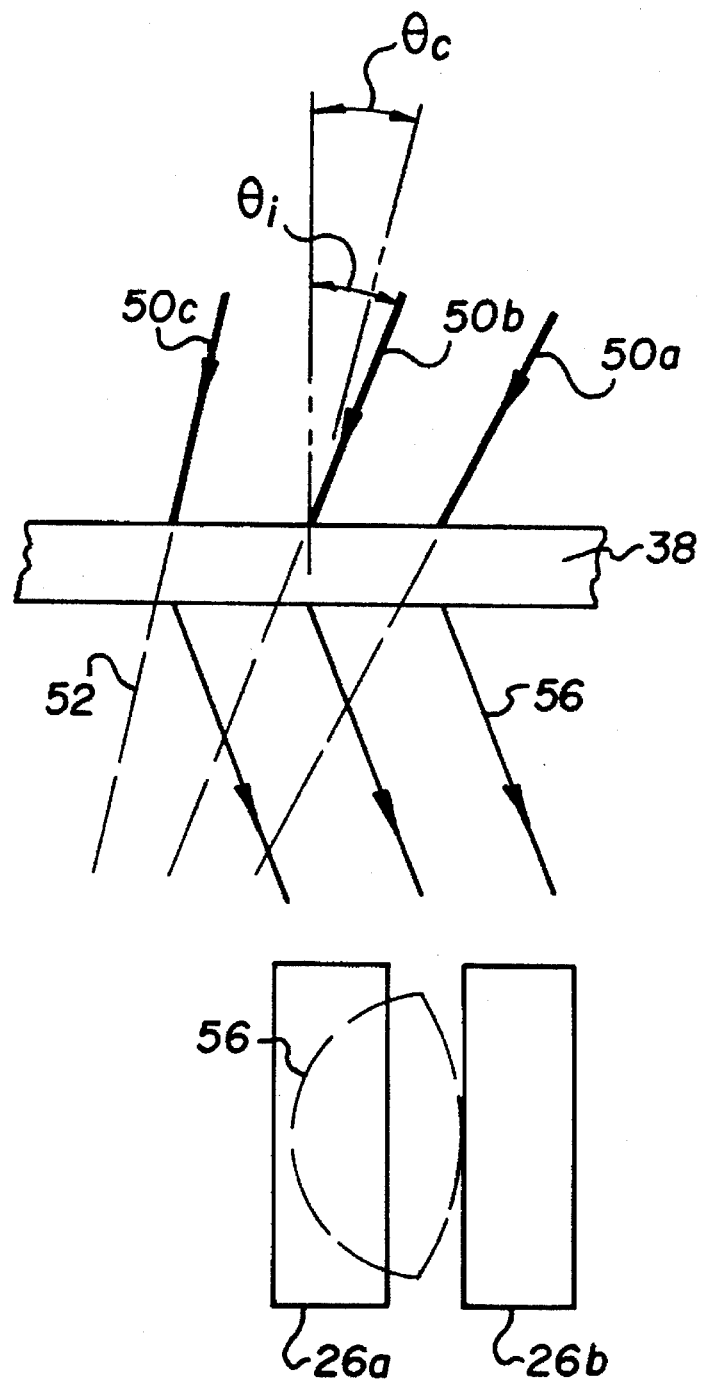
Figure 4E:
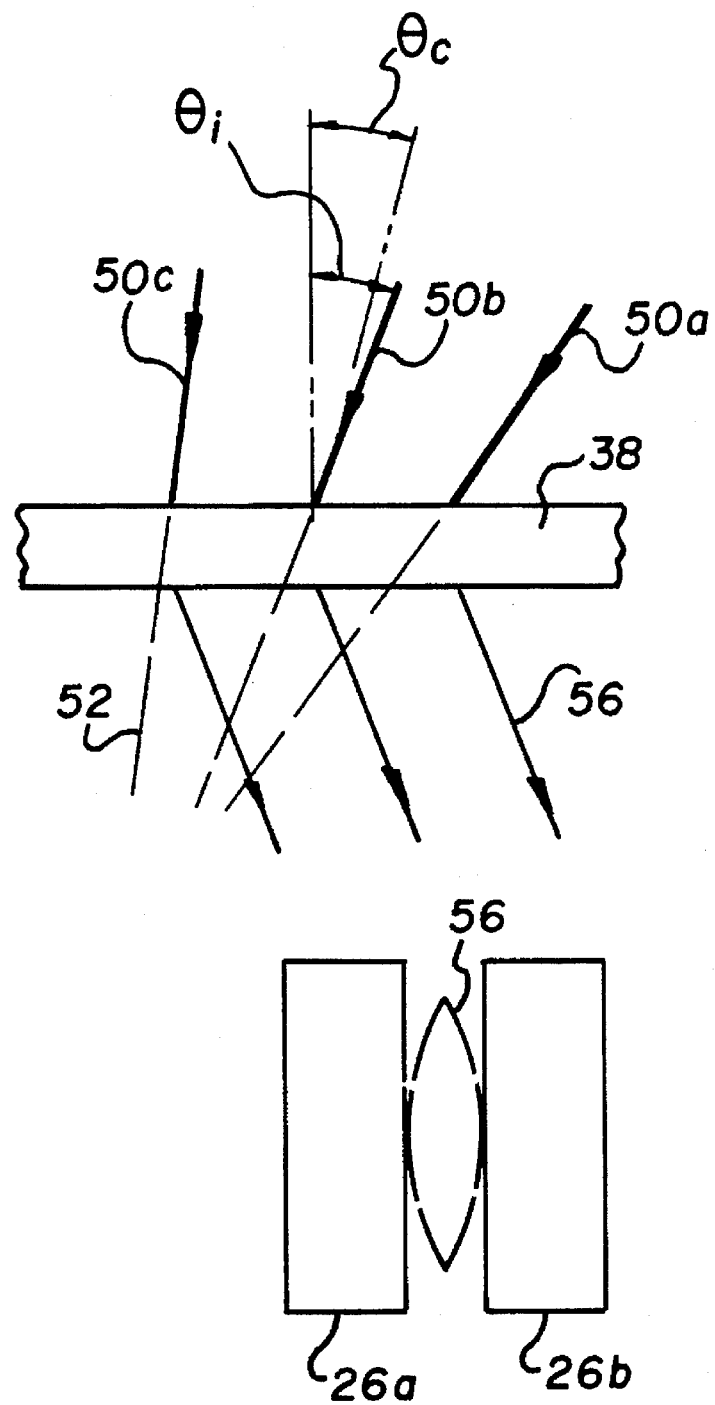

When the disk 12 moves away from the objective lens 22 the beam 50 returning from the disk 12 will be converging (see FIG. 4d). Now the side of the aperture containing ray 50a will have an increase in the angle separating it from the peak efficiency coupling angle $\theta_c$ and thus produce a decrease in the intensity falling onto detector pair 26b. Again, for the opposite half of the aperture there is a decrease in the angle separating the peak efficiency coupling angle $\theta_c$ and the incident ray angle $\theta_i$ to produce an increase in the intensity. As the separation continues to increase (see FIG. 4e), the portion of the beam near the marginal ray 50c will sweep beyond the peak efficiency coupling angle $\theta_c$ and this portion of the output coupled beam 56 will darken. Again, the input coupling will continue near the center of the aperture as illustrated.

EXAMPLE 2

The operation of the waveguide device was tested by placing it in the return-beam path of an optical head like that depicted in FIG. 2. An aluminized target was used to simulate a disk 12, and focus and tracking errors were independently generated by movement of the objective lens 22 mounted in an actuator assembly 23. Only a portion of the target area included tracking grooves, allowing independent generation of focus error. The groove specification of the target included: a square-wave profile, 2.0 mm pitch, 70 nm groove depth, and a duty cycle of 50%.

Minimizing focus error is critical for maintaining a specific spot size at the disk 12 in order to achieve a high signal-to-noise level for readout of data, recorded information. If a collimated incident beam 15 is focused by the objective lens 22 perfectly onto a disk 12, it will also recollimate the reflected beam 50, which returns. Positive focus error occurs when the disk 12 is too near the objective lens 22, and the return beam 50 split from the polarizing beam splitter 18 will be diverging. Alternatively, when the disk 12 is too far from the objective lens 22, negative focus error results, and the return beam 50 will be converging.

Preferred arrangements for sensing focus errors are ways of detecting slight deviations from collimation of the reflected beam to generate differential signals. A focus error produces an angular spectrum across the aperture of the beam 50 returning through the element 38. The range of angles contained in beam 50 for a particular separation between the objective lens 22 and the disk 12 is the result of the numerical aperture NA of the objective lens 22, and the direction and magnitude of the defocus.

Figure 5:
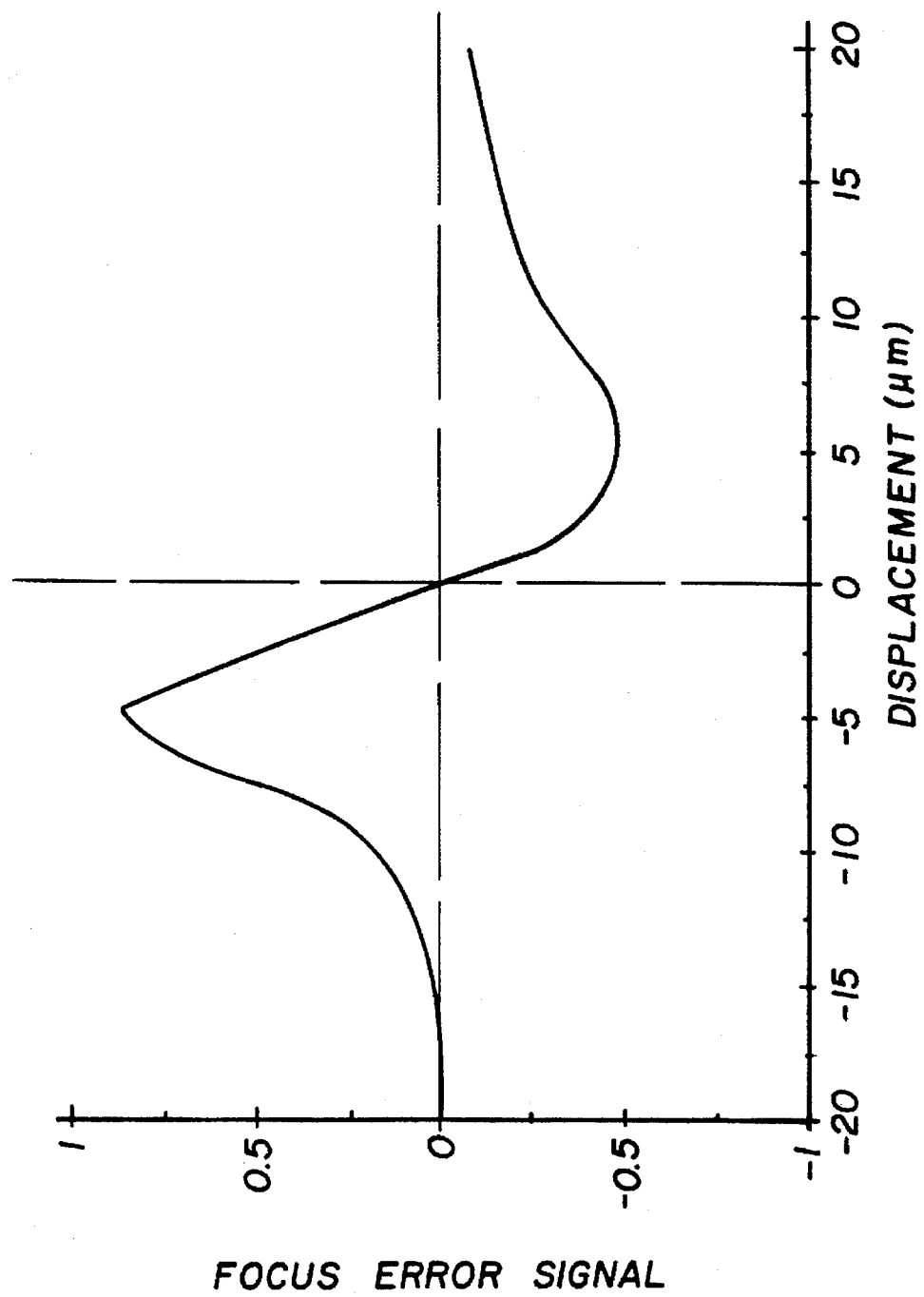
FIG. 5 is a graph plotting focus error versus position of an objective lens shown in FIG. 2 with respect to an optical disk.

A focus error signal was generated using the optical system 10 of FIG. 2 with two detectors 26a and 26b placed in the path of the output coupled optical beam 56 as shown. The relative size of detectors 26a and 26b to that of the optical beam 56 and position in the beam was very near that illustrated in FIG. 4. Rather than moving the disk 12, the objective lens 22 was mounted in an actuator assembly 23 and the objective lens 22 was positioned with an actuator controller 36. A sweep of the objective lens 22 and the difference between the signals from detectors 26a and 26b produced the signal shown in FIG. 5. The peak to peak separation or working distance between the maximum and minimum value was about 12 µm. If a faster electronic response is needed, the size of the active areas of detector pair 26 should be reduced. A lens 24 could be placed after the element 38 to reduce the size of the detector pair 26 placed near the focal position of the lens 24.

EXAMPLE 3

The track groove or track marks of an optical disk 12 serve as optical guides ensuring no interruption in the readout of a continuous data stream contained along the length of a track. If the optical beam 15 position is not held within the tolerances for following the optical guides (i.e., tracking error), the data signal level, and ultimately the confidence in the readout information, degrades. The tracks of an optical disk 12 serve as a one-dimensional reflection grating to diffract the light into multiple orders. Since the light incident on the tracks is tightly focused, the diffracted beams will be diverging, and by design only the +1 and −1 orders return through the aperture of the objective lens 22. These orders do not usually overlap each other, but overlap and interfere with the beam returning through the objective lens 22. When the focused beam 15 is centered on a track, the interference effect is identical for both orders. But if decentered, the orders interfere differently, creating asymmetry in the intensity distribution of the beam 50 returning through the objective lens 22. The line of asymmetry occurs parallel to the tracks of the disk 12, and a tracking error signal can be generated using a simple detector pair like those illustrated for focus error in FIGS. 4a–4e, each detector of the detector pair 28 sampling an area of the beam 52 containing a diffracted order, and differencing the detector outputs.

This waveguide-grating system 38 permits for independent signals for focus and tracking. The beam 52 transmitted through the element 38 (not input coupled) can be used for both data detection and tracking error signal detection. By centering a detector pair 28 as described above relative to the beam 52, with the detector pair 28 oriented orthogonal to those used for focus error signal generation, and differencing the detector output from detector pair 28. The data detection signal can be the sum of the outputs of both detectors for detector pair 28 and may include in the sum the output of detector pair 26.

In evaluating error signal detection in a dynamically operated system where the focus and tracking errors can occur simultaneously (i.e., closed-loop correction of the position errors), the crosstalk between the signals must be examined. Crosstalk is a change in an error signal attributed to a position error between the objective lens 22 and disk 12 along the incorrect axis. The magnitude of crosstalk must be reduced to a level where it does not produce an artificial error greater than the tolerance for position control. To simultaneously generate focus and tracking errors, the objective lens 22 was synchronously scanned using actuator assembly 23 along the focus and tracking error axes while monitoring the difference between detector 26a and 26b outputs.

Figure 6:
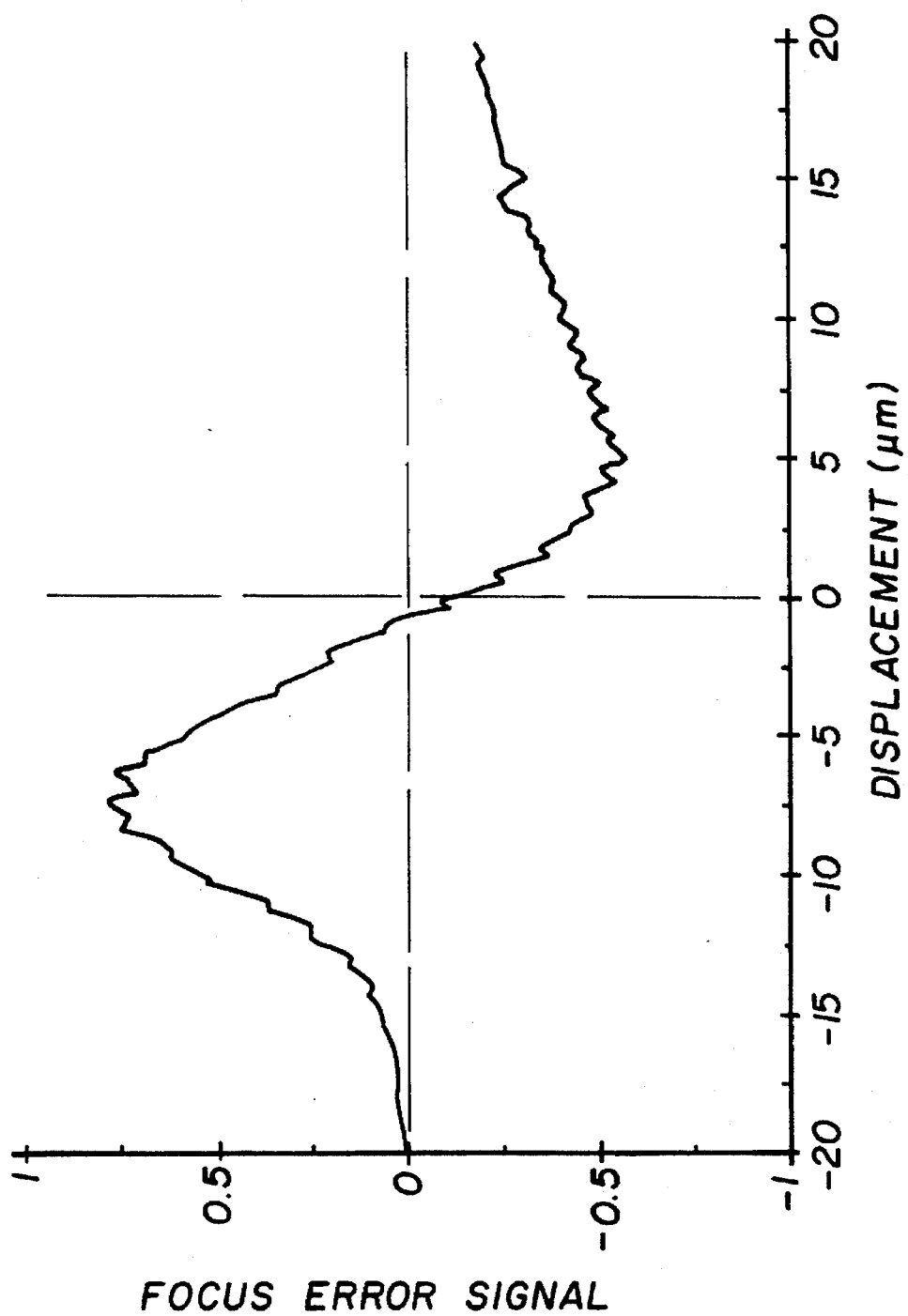
FIG. 6 is another graph plotting focus error versus position of an objective lens shown in FIG. 2 with respect to an optical disk and illustrates the low level of crosstalk from the tracking error signal.

FIG. 6 shows the error signal that resulted. The high frequency oscillation added to the FES demonstrates the crosstalk occurring throughout the range of displacement. The crosstalk of FIG. 6 would produce an artificial error of less than ±0.24 μm. This is considered a tolerable level for operation in current optical recording systems.

In accordance with the present invention, the use of element 38 for generating focus error signals that are traditionally generated with bulk optical elements. The focus error signal generated was in a useful form and had a low level of crosstalk. The inclusion of the waveguide-grating element 38 into an optical head design to construct a hybrid-optical system can take forms understood by those skilled in the art, only one of which was illustrated. Also, because the entire aperture would be used for generation of both focus error and tracking error signals, the effects of birefringence of the optical disk 12 on the uniformity of splitting from the polarizing splitter 18 of FIG. 2 could be tolerated by dividing the focus error signal by the sum of detectors 26a and 26b.

The gratings 44 and 46 are continuous and are provided in a relatively simple element 38 inserted into the optical path. For manufacturing of these gratings 44 and 46, grating surfaces can be fabricated on large area substrates and then diced to the standard optical element size. The factors affecting the performance of the element 38 are the depth of the grating grooves for each grating 44 and 46 to determine the amount of light reaching the detector 26.

Beyond optical recording there are other applications where these principles of analysis can be applied, including analysis of optical beams for distortion of the wavefront and alignment of optical elements. Another application is detection of changes in the immediate environment surrounding a device by observing changes in the physical or optical properties of the waveguide-grating system. The present invention provides quantitative information by use of a differential signal. However, to further extend the application of these devices to systems utilizing standard-diode sources, narrow-band achromatization of the input-coupling is needed.

The invention has been described in detail with particular reference to certain preferred embodiments thereof, but it will be understood that variations and modifications can be effected within the spirit and scope of the invention.

Parts List 10 optical system
12 optical disk
14 laser diode
15 beam of light
16 lens
18 beam splitter
20 wave plate
22 objective lens
23 actuator assembly
24 condensing lens
26 detector pair
28 detector pair
30 focus error processor
32 data processor
34 tracking error processor
36 actuator controller
38 element
40 transparent substrate
42 waveguide
44 grating
46 grating
48 cladding layer
50 beam of light
50a marginal ray
50b chief ray
50c marginal ray
52 beam of light
54 beam of light
56 beam of light

I claim:

1. An optical system for recording or reading out information from an optical disk said system comprising: a focus error detector pair and data and tracking error detector pair, and an element responsive to a beam of light projected off of the optical disk and having a transparent substrate and a substantially internal reflecting waveguide with gratings formed on the top and bottom surfaces, each waveguide-grating having a predetermined grating period, with the periods being different and selected so that a separate focus error signal beam is projected onto the detector pair for focus error detection, and a separate transmitted beam is provided through the element and projected onto the detector pair for data and tracking error detection.

2. The optical system of claim 1 wherein the element further includes a cladding and a substrate and wherein the refractive index of the waveguide is greater than the refractive indices of the substrate and cladding.

3. An optical system for recording or reading out information from an optical disk and which includes a detector pair for focus error detection and a detector pair for data and tracking error detection comprising:

a) a source of laser light;

b) means for projecting such laser light onto an optical disk including an objective lens, such projection means also being adapted to project light reflected from the disk onto the detector pair for focus error detection and detector pair for tracking error detection; and c) an element responsive to the beam of light reflected off of the optical disk and having a transparent substrate and a substantially internal reflecting waveguide with gratings formed on the top and bottom surfaces, each waveguide-grating having a predetermined grating period, with the periods being different and selected so that a separate focus error signal beam is projected onto the detector pair for focus error detection, and a separate transmitted beam is provided through the element and projected onto the detector pair for data and tracking error detection.

4. The optical system of claim 3 including an actuator for controlling the objective lens in response to a focus error signal and means coupled to the detector pair for focus error detection for providing the focus error signal to the actuator.

5. The optical system of claim 3 wherein the element further includes a cladding layer and a substrate and wherein the refractive index of the waveguide is greater than the refractive indices of the substrate and cladding.

* * * * *